US012616637B2

(12) United States Patent
Kaufman et al.

(10) Patent No.: US 12,616,637 B2
(45) Date of Patent: May 5, 2026

(54) CPR CHEST COMPRESSION SYSTEM WITH TONOMETRIC INPUT AND FEEDBACK

(71) Applicant: ZOLL Medical Corporation, Chelmsford, MA (US)

(72) Inventors: Christopher L Kaufman, Somerville, MA (US); Gary A Freeman, Waltham, MA (US)

(73) Assignee: ZOLL Medical Corporation, Chelmsford, MA (US)

( * ) Notice: Subject to any disclaimer, the term of this patent is extended or adjusted under 35 U.S.C. 154(b) by 339 days.

(21) Appl. No.: 18/149,865

(22) Filed: Jan. 4, 2023

(65) Prior Publication Data

US 2023/0233404 A1 Jul. 27, 2023

Related U.S. Application Data

(63) Continuation of application No. 16/741,925, filed on Jan. 14, 2020, now Pat. No. 11,583,471, which is a continuation of application No. 14/659,612, filed on Mar. 16, 2015, now Pat. No. 10,596,064.

(60) Provisional application No. 61/955,109, filed on Mar. 18, 2014.

(51) Int. Cl.
*A61H 31/00* (2006.01)
*A61H 11/00* (2006.01)

(52) U.S. Cl.
CPC ......... *A61H 31/005* (2013.01); *A61H 31/006* (2013.01); *A61H 2011/005* (2013.01); *A61H 2201/1215* (2013.01); *A61H 2201/5007* (2013.01); *A61H 2201/5046* (2013.01); *A61H 2201/5071* (2013.01); *A61H 2230/045* (2013.01)

(58) Field of Classification Search
CPC .... A61H 31/00; A61H 31/004; A61H 31/005; A61H 31/006; A61H 31/007
See application file for complete search history.

(56) References Cited

U.S. PATENT DOCUMENTS

| | | | |
|---|---|---|---|
| 3,651,801 | A | 3/1972 | Kullok |
| 4,059,099 | A | 11/1977 | Davis |
| 4,088,138 | A | 5/1978 | Diack et al. |
| RE30,372 | E | 8/1980 | Mirowski et al. |
| 4,296,755 | A | 10/1981 | Judell |
| 4,355,634 | A | 10/1982 | Kanter |
| 4,588,383 | A | 5/1986 | Parker et al. |
| 4,610,254 | A | 9/1986 | Morgan et al. |
| 4,619,265 | A | 10/1986 | Morgan et al. |
| 4,680,708 | A | 7/1987 | Ambos et al. |
| 4,863,385 | A | 9/1989 | Pierce |
| 4,928,674 | A | 5/1990 | Halperin et al. |
| 5,077,667 | A | 12/1991 | Brown et al. |
| 5,092,341 | A | 3/1992 | Kelen |
| 5,109,862 | A | 5/1992 | Kelen et al. |

(Continued)

FOREIGN PATENT DOCUMENTS

WO WO-2010004499 A1 * 1/2010 ........... A61H 31/004

OTHER PUBLICATIONS

US 6,303,107 B1, 10/2001, Myklebust et al. (withdrawn)

*Primary Examiner* — Timothy A Stanis
*Assistant Examiner* — Christopher E Miller
(74) *Attorney, Agent, or Firm* — ZOLL Medical Corporation

(57) ABSTRACT

A CPR chest compression system which uses tonometric data as feedback for control of chest compression device.

22 Claims, 6 Drawing Sheets

(56) References Cited

U.S. PATENT DOCUMENTS

| | | | | | |
|---|---|---|---|---|---|
| 5,247,945 | A | | 9/1993 | Heinze et al. | |
| 5,285,792 | A | | 2/1994 | Sjoquist et al. | |
| 5,289,823 | A | | 3/1994 | Eckerle | |
| RE34,800 | E | | 11/1994 | Hutchins | |
| 5,391,187 | A | | 2/1995 | Freeman | |
| 5,466,244 | A | | 11/1995 | Morgan | |
| 5,474,574 | A | | 12/1995 | Payne et al. | |
| 5,496,257 | A | | 3/1996 | Kelly | |
| 5,511,553 | A | | 4/1996 | Segalowitz | |
| 5,562,710 | A | | 10/1996 | Olsen et al. | |
| 5,588,422 | A | * | 12/1996 | Lurie | A61K 38/095 128/202.28 |
| 5,589,639 | A | | 12/1996 | Antonio et al. | |
| 5,591,213 | A | | 1/1997 | Morgan | |
| 5,611,815 | A | | 3/1997 | Cole et al. | |
| 5,617,853 | A | | 4/1997 | Morgan | |
| 5,619,265 | A | | 4/1997 | Suzuki et al. | |
| 5,645,571 | A | | 7/1997 | Olson et al. | |
| 5,662,690 | A | | 9/1997 | Cole et al. | |
| 5,683,424 | A | | 11/1997 | Brown et al. | |
| 5,700,281 | A | | 12/1997 | Brewer et al. | |
| 5,735,879 | A | | 4/1998 | Gliner et al. | |
| 5,755,671 | A | | 5/1998 | Albrecht et al. | |
| 5,957,856 | A | | 9/1999 | Weil et al. | |
| 6,010,457 | A | | 1/2000 | O'Rourke et al. | |
| 6,125,299 | A | | 9/2000 | Groenke et al. | |
| 6,171,257 | B1 | | 1/2001 | Weil et al. | |
| 6,174,295 | B1 | | 1/2001 | Cantrell et al. | |
| 6,178,357 | B1 | | 1/2001 | Gliner et al. | |
| 6,201,992 | B1 | | 3/2001 | Freeman | |
| 6,224,562 | B1 | | 5/2001 | Lurie et al. | |
| 6,246,907 | B1 | | 6/2001 | Lin et al. | |
| 6,263,238 | B1 | | 7/2001 | Brewer et al. | |
| 6,308,094 | B1 | | 10/2001 | Shusterman et al. | |
| 6,331,162 | B1 | * | 12/2001 | Mitchell | A61B 5/0285 600/500 |
| 6,351,671 | B1 | | 2/2002 | Myklebust et al. | |
| 6,390,996 | B1 | | 5/2002 | Halperin et al. | |
| 6,393,316 | B1 | | 5/2002 | Gillberg et al. | |
| 6,418,342 | B1 | | 7/2002 | Owen et al. | |
| 6,427,685 | B1 | | 8/2002 | Ray, II | |
| 6,438,419 | B1 | | 8/2002 | Callaway et al. | |
| 6,496,731 | B1 | | 12/2002 | Lovett | |
| 6,558,335 | B1 | | 5/2003 | Thede | |
| 6,589,267 | B1 | * | 7/2003 | Hui | A61H 31/008 601/152 |
| 6,597,943 | B2 | | 7/2003 | Taha et al. | |
| 6,658,290 | B1 | | 12/2003 | Lin et al. | |
| 6,662,032 | B1 | * | 12/2003 | Gavish | A61B 5/4857 600/323 |
| 6,671,545 | B2 | | 12/2003 | Fincke | |
| 6,687,540 | B2 | | 2/2004 | Marcovecchio | |
| 6,740,045 | B2 | | 5/2004 | Amano | |
| 6,805,672 | B2 | | 10/2004 | Martin et al. | |
| 6,827,695 | B2 | | 12/2004 | Palazzolo et al. | |
| 6,865,413 | B2 | | 3/2005 | Halperin et al. | |
| 6,872,080 | B2 | | 3/2005 | Pastrick et al. | |
| 6,961,612 | B2 | | 11/2005 | Elghazzawi et al. | |

| | | | | | |
|---|---|---|---|---|---|
| 7,056,295 | B2 | | 6/2006 | Halperin | |
| 7,074,199 | B2 | | 7/2006 | Halperin et al. | |
| 7,108,665 | B2 | | 9/2006 | Halperin et al. | |
| 7,190,999 | B2 | | 3/2007 | Geheb et al. | |
| 7,220,235 | B2 | | 5/2007 | Geheb et al. | |
| 7,311,680 | B2 | | 12/2007 | Lenhart et al. | |
| 7,410,470 | B2 | | 8/2008 | Escudero et al. | |
| 7,570,993 | B2 | | 8/2009 | Weil et al. | |
| 7,650,181 | B2 | | 1/2010 | Freeman et al. | |
| 7,946,994 | B2 | | 5/2011 | Finburgh et al. | |
| 7,993,290 | B2 | | 8/2011 | Lund et al. | |
| 8,034,006 | B2 | | 10/2011 | Celik-Butler et al. | |
| 8,333,720 | B2 | | 12/2012 | Nysaether | |
| 8,394,040 | B2 | | 3/2013 | Strand et al. | |
| 8,408,207 | B2 | | 4/2013 | Steen et al. | |
| 8,511,308 | B2 | | 8/2013 | Hecox et al. | |
| 8,532,765 | B2 | | 9/2013 | Ochs et al. | |
| 8,560,245 | B2 | | 10/2013 | Li et al. | |
| 8,690,804 | B2 | | 4/2014 | Nilsson et al. | |
| 8,712,493 | B2 | | 4/2014 | Ukawa | |
| 8,731,658 | B2 | | 5/2014 | Hampton et al. | |
| 8,738,129 | B2 | | 5/2014 | Packer et al. | |
| 8,744,542 | B2 | | 6/2014 | Ukawa | |
| 8,876,742 | B2 | | 11/2014 | Centen | |
| 8,903,498 | B2 | | 12/2014 | Sullivan et al. | |
| 9,198,826 | B2 | | 12/2015 | Banville et al. | |
| 9,248,306 | B2 | | 2/2016 | Joo et al. | |
| 9,259,543 | B2 | | 2/2016 | Paradis et al. | |
| 9,357,934 | B2 | | 6/2016 | Watson et al. | |
| 9,486,390 | B2 | | 11/2016 | Centen et al. | |
| 9,861,311 | B2 | | 1/2018 | Freeman et al. | |
| 10,143,619 | B2 | | 12/2018 | Chapman et al. | |
| 2002/0047140 | A1 | | 4/2002 | Moller et al. | |
| 2002/0055694 | A1 | * | 5/2002 | Halperin | A61B 5/0205 601/41 |
| 2002/0165585 | A1 | | 11/2002 | Dupelle et al. | |
| 2003/0163051 | A1 | | 8/2003 | Eckerle et al. | |
| 2005/0137929 | A1 | | 6/2005 | Frazier et al. | |
| 2005/0143640 | A1 | * | 6/2005 | Hoctor | A61B 8/4236 600/407 |
| 2009/0076398 | A1 | * | 3/2009 | Li | A61B 5/021 600/494 |
| 2010/0022886 | A1 | | 1/2010 | Ayati et al. | |
| 2010/0198118 | A1 | * | 8/2010 | Itnati | A61H 31/006 601/41 |
| 2011/0184759 | A1 | | 7/2011 | Selker et al. | |
| 2011/0301513 | A1 | | 12/2011 | Freeman | |
| 2012/0016179 | A1 | * | 1/2012 | Paradis | A61N 1/3987 601/41 |
| 2012/0041313 | A1 | | 2/2012 | Tanaka et al. | |
| 2012/0191476 | A1 | | 7/2012 | Reid et al. | |
| 2012/0220887 | A1 | | 8/2012 | Fossan | |
| 2013/0304112 | A1 | * | 11/2013 | Ting | A61B 5/02108 606/203 |
| 2014/0135634 | A1 | | 5/2014 | Pranevicius et al. | |
| 2014/0277228 | A1 | | 9/2014 | Quan et al. | |
| 2015/0018823 | A1 | | 1/2015 | Centen | |
| 2015/0164417 | A1 | | 6/2015 | Tupin, Jr. | |
| 2015/0283027 | A1 | | 10/2015 | Lampe et al. | |
| 2016/0317385 | A1 | | 11/2016 | Salcido et al. | |

* cited by examiner 2 inch compressions, 300 msec release

CPR CHEST COMPRESSION SYSTEM WITH TONOMETRIC INPUT AND FEEDBACK

CROSS-REFERENCE TO RELATED APPLICATIONS

This application is a continuation of U.S. patent application Ser. No. 16/741,925, filed Jan. 14, 2020, which is a continuation of U.S. patent application Ser. No. 14/659,612, filed Mar. 16, 2015, which claims benefit under 35 U.S.C. § 119(e) to U.S. Provisional Application Ser. No. 61/955,109 filed Mar. 18, 2014. All subject matter set forth in each of the above referenced applications is hereby incorporated by reference in its entirety into the present application as if fully set forth herein.

FIELD OF THE INVENTIONS

The inventions described below relate to the field of CPR.

BACKGROUND OF THE INVENTIONS

The AutoPulse® chest compression device is used to provide chest compressions during the course of CPR in reviving a cardiac arrest victim. The AutoPulse® provides compressions according to a predetermined compression waveform which is optimized for a large variety of potential victims. We have previously proposed feedback control, based on sensed biological parameters, to alter the compression waveform applied by the chest compression device. The biological parameters proposed, including end-tidal $CO_2$ and blood oxygen levels, are readily measured with non-invasive devices.

The operation of chest compression devices can be improved with the use of more fundamental biological parameters, such as aortic blood flow volume, the aortic pulse pressure waveform, and other blood vessel parameters, as feedback for control of the chest compression device. Depending on the value of aortic blood flow volume and blood vessel parameters, the compression waveform provided by the chest compression device may be varied. The compression waveform may be varied from patient to patient, depending on the value of aortic blood flow volume and/or blood vessel parameters measured before or at the commencement of chest compressions. The compression waveform may be varied during the course of CPR chest compression on a single patient, depending on the value of aortic blood flow volume and/or blood vessel parameters measured over the course of resuscitation efforts and chest compressions. Chest compression waveform characteristics such as compression depth, compression rate, compression rise time, compression hold time, and release velocity can be varied to optimize compression induced blood flow in the cardiac arrest victim.

Adjunct therapies, especially the administration of epinephrine, can be implemented, modified or avoided based on information gleaned from the biological parameters, such as arterial stiffness and/or pulse wave velocity.

A number of terms relating to blood flow parameters are used in the art, including the following:

The pulse pressure waveform is a depiction of pressure versus time in a particular blood vessel.

SPTI refers to the systolic pressure-time integral, which is the area under the central aortic pressure wave curve during the systole portion of a heartbeat (when the left ventricle is contracting). SPTI is also referred to as left ventricular load, or LV load. Systole is that portion of the heartbeat starting at the closure of the atrioventricular (cuspid) valves and ending with the closure of the aortic valve.

DPTI refers to the diastolic pressure-time integral, which is the area under the central aortic pressure wave curve during the diastole portion of a heartbeat (when the heart left ventricle is relaxing). Diastole is that portion of the heartbeat in which the heart is relaxing, starting with closure of the aortic valve and ending with the subsequent closure of the atrioventricular valves.

Arterial Compliance, a measure of the stiffness, refers to the mechanical characteristic of blood vessels throughout the body. If refers to the ability or inability of blood vessels to elastically expand in response to pulsatile flow. It is quantified in terms of ml/mm Hg (the change in volume due to a given change in pressure). Elastance is a reciprocal concept, and refers to the tendency of blood vessels to recoil after distension. In relation to the aorta, aortic compliance/elastance affects the ability of the aorta to expand and contract during and after contraction of the heart which forces blood from the left ventricle.

The aortic pulse pressure waveform can be determined non-invasively, based on peripheral pulse waveforms obtained with sensors mounted on the patient. Sensors can measure pressure and/or velocity at superficial locations of the radial artery, brachial artery, carotid and/or femoral artery. Various known models and "transfer functions" can be used to determine the aortic pressure wave from pressure waves measurements at peripheral locations such as the radial artery, brachial artery, carotid and/or femoral artery. See Chen, et al., *Estimation of Central Aortic Pressure Waveform by Mathematical Transformation of Radial Tonometry Pressure,* 95 Circulation 1827 (1997). The transfer function used for this estimate may be generalized, in the sense that the same generally applicable and sufficiently reliable transfer function is used to determine the aortic pressure wave for all patients. The transfer function can be different for known significantly different subpopulations, so that one transformation is applicable and sufficiently reliable for one group (men, for example) while a different transformation is applicable and sufficiently reliable for another group (women, for example. The transfer function can be individualized, such that, for each individual patient, a different transfer function is determined, and then used to estimate the aortic pressure wave from peripheral pressure waves. Use of non-invasive measurements to estimate aortic pressure wave allows for control of a chest compression device based on the pressure waveform in the field. (Waveforms obtained by invasive pressure sensors in the aorta might also be used in hospital, where it is more appropriate to install devices in the aorta of a patient).

Pulse wave velocity is used as a measure of arterial stiffness. It is defined as the velocity at which a pressure wave, travelling from the proximal aorta, travels to peripheral cites such as the superficially accessible portions of the carotid, brachial, radial or femoral arteries.

Pulse transit time is defined as the time it takes for a pulse waveform to travel from one location to another in the body. For example, the pulse transit time may be specified as the time it takes for a peak of the pulse pressure to travel from a proximal location to a more distal location in the arm, or from the carotid artery in the neck to the radial artery at the wrist. In some references, pulse transit time (PTT) is defined as the time it takes for the arterial pulse pressure wave, starting from the aortic valve, to reach a peripheral site. Pulse transit time is dependent on the resistance to flow presented by the peripheral blood vessels. High peripheral resistance is beneficial during CPR, because it limits blood flow to the peripheral blood vessels and thus forces any blood flow induced by compressions to the heart and brain.

Various values of these parameters have been associated with cardiovascular disease and risk of heart attack and stroke. They may be valuable in predicting the risk of future course of cardiovascular disease. These parameters have not been used as feedback for modification of resuscitation efforts for a patient in cardiac arrest. During sudden cardiac arrest and CPR chest compressions, some of the parameters become meaningless, while some parameters provide useful information pertaining to the course of CPR compressions and resuscitation. Some of the parameters, or related parameters, used for diagnosis can be used as feedback for control of CPR compression devices, while some related parameters defined below, which are meaningful solely in relation to CPR compressions, can be used as feedback for control of CPR compression devices.

SUMMARY

The devices and methods described below provide for optimized treatment of patients in cardiac arrest. Using tonometric data obtained from the patient, various blood vessel parameters can be determined. Based on the value of the blood vessel parameters, resuscitation efforts can be varied to enhance blood flow induced by CPR compressions, and hence enhance the chances of reviving the patient. Aspects of resuscitation that may be varied in response to blood vessel parameters include various chest compression parameters which can be varied to optimize blood flow as indicated by blood vessel parameters and the administration of epinephrine, which may be administered or avoided depending on the determined values of blood vessel parameters.

DETAILED DESCRIPTION OF THE INVENTIONS

Figure 1:
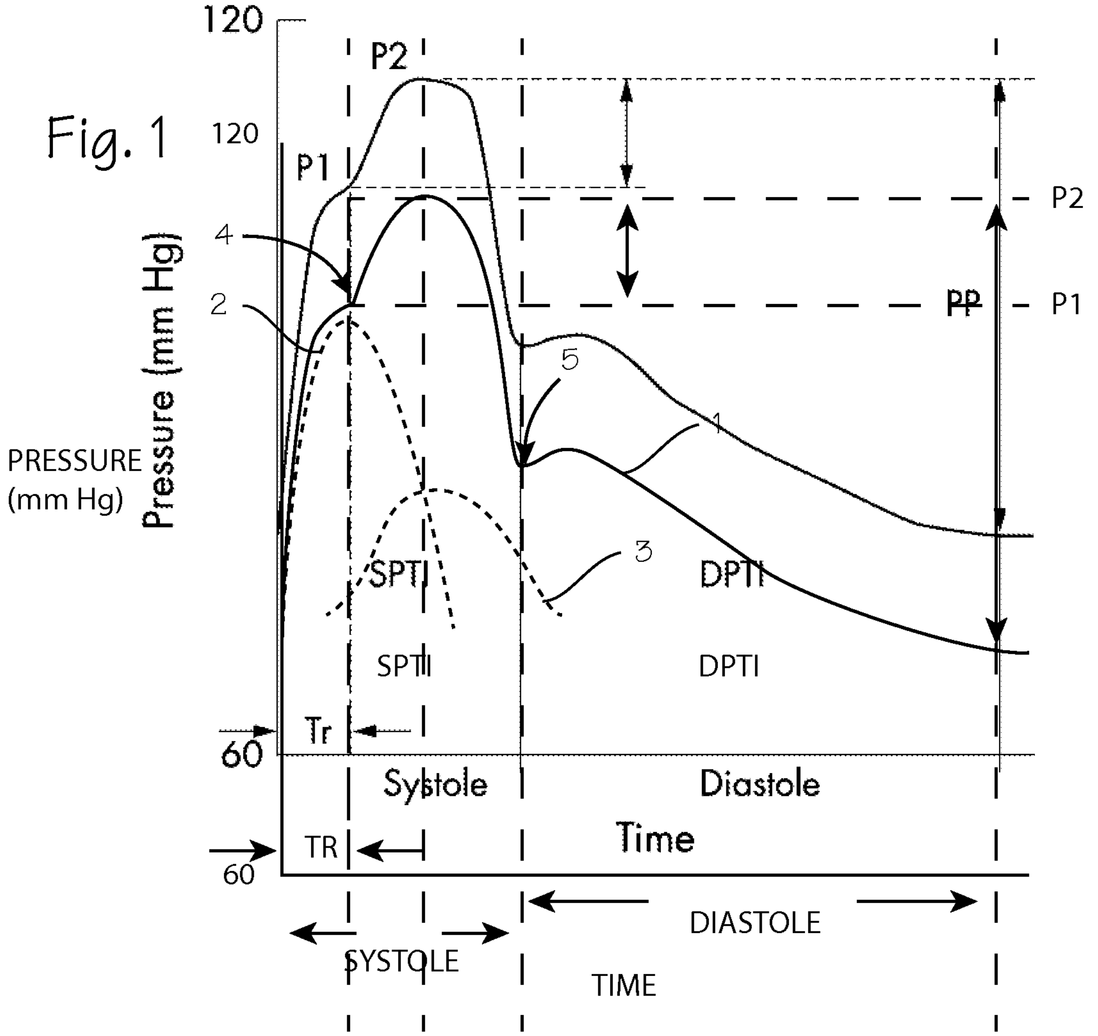
FIG. 1 depicts a pulse pressure waveform typical of a healthy patient.

The pulse pressure waveform is used to determine the health of the cardiovascular system of a patient. FIG. 1 depicts a pulse pressure waveform 1 typical of a healthy patient. This waveform may be measured at various points in the body, but an aortic pulse pressure waveform is depicted in FIG. 1. This waveform represents the blood pressure in the aorta, which includes two major sources of pressure. The first source of pressure is the pressure generated by the pumping action of the left ventricle, depicted by ventricular pressure wave 2. The second source of pressure is the resilient reaction of the aorta and other blood vessels, which "reflects" the pressure wave caused by the pumping action of the heart, and is depicted by the reflected waveform 3. The waveform helps define some of the parameters that may be used as feedback for CPR compressions or to inform the decision to use epinephrine or other therapies. The combined pressure wave 1 is a summation of the two pressure waves. The reflected wave is delayed, relative to the primary ventricular wave. The appearance of the reflected wave in the aorta appears on the graph as the inflection point or anacrotic notch 4. The time between the start of the pulse wave and the appearance of the reflected wave, as indicated by the inflection point, is the return time, or Tr. This inflection point is also taken as the peak of the ventricular pressure wave, Pl. The peak of the combined pressure wave 1 is P2. The augmentation index is the difference between the two peaks. (In young healthy patients, P2 is usually greater than Pl, so that the augmentation index is positive.) The dicrotic notch 5, which occurs when the aortic valve closes, marks the end of the systolic portion of the heart beat and the beginning of diastolic part of the heart beat. The area under the curve during systole is referred to as (SPTI). The area under the curve during diastole is referred to as (DPTI). SPTI is roughly related to the volume of blood flowing through arteries due to prior chest compressions.

The SPTI is an indicator of coronary perfusion and cerebral perfusion. Thus, the pulse pressure waveform may be analyzed to determine the health of a patient. Features of the pulse pressure waveform which are indicators of good blood flow and good vascular tone include:

- SPTI, for which larger values are better;
- DPTI, for which larger values are better; Augmentation Index,
- for which larger values are better; and
- Return time, for which shorter times are better.

However, these parameters are defined in terms of events that do not occur, or may not clearly and unambiguously occur, during CPR chest compressions. The pulse pressure waveform obtained during CPR compressions may or may not resemble the normal pulse pressure waveform.

Figure 2:
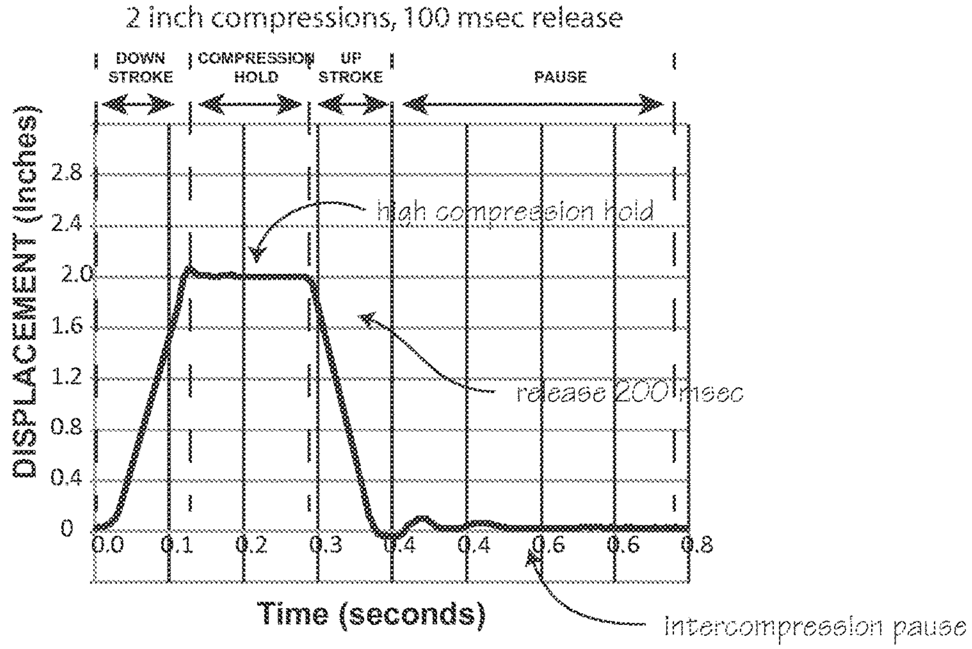
FIG. 2 depicts a compression waveform resulting from the operation of a CPR compression device.

The relationship of the CPR compression cycle and the resultant CPR-induced pulse waves and corresponding pulse pressure waveform is depicted in FIGS. 2 through 7. FIG. 2 depicts a compression waveform resulting from the operation of a CPR compression device. Compressions are accomplished at a rate of 80 compressions per minute, or 750 milliseconds per compression cycle. FIG. 2 shows a single compression cycle, including an inter-compression pause (for the AutoPulse®, the belt is held taut during this period between compressions), the compression down stroke (in which the belt is rapidly tightened to compress the chest), a compression hold (in which the belt holds the chest in a maximum state of compression), and an upstroke/release period (in which the compressive force on the chest is removed by releasing the belt). To relate this to the terminology used in relation to a normal heartbeat, the compression period, which includes the compression down stroke and, if accomplished by the CPR compression device, the compression hold period, corresponds roughly to the systole of a normal heartbeat, so we refer to it as CPR-systole, and the release phase and inter-compression pause roughly correspond to the diastole of a normal heartbeat, so we refer to it as CPR-diastole. (Not all CPR compression devices provide a compression hold after the compression down stroke, in which case the CPR-systole period may be defined as the period of the down stroke, and the CPR-diastole may be defined as the period of the release stroke and any intercompression pause.)

Figure 3:
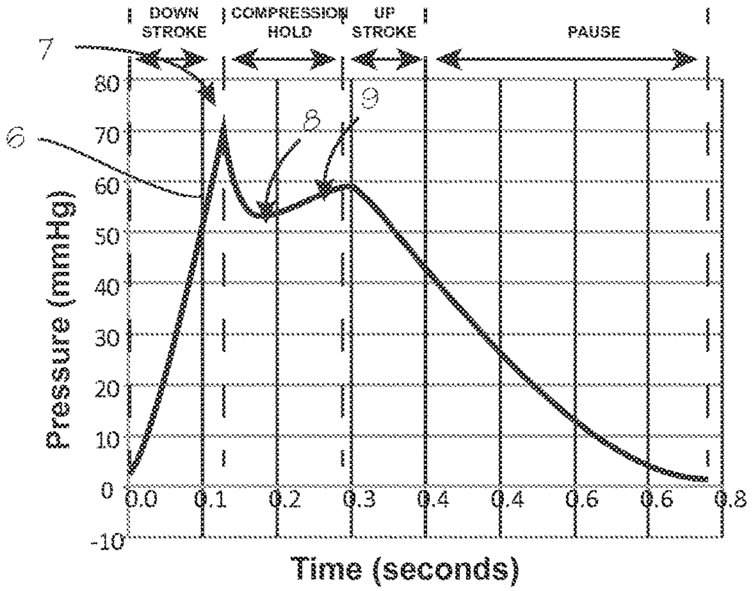
FIG. 3 depicts a pulse pressure waveform of a cardiac arrest victim undergoing effective CPR chest compressions depicted in FIG. 2.

FIG. 3 depicts a pulse pressure waveform of a cardiac arrest victim undergoing effective CPR chest compressions. The waveform is induced by CPR compressions performed by an AutoPulse® CPR compression device operating at 80 compressions per minute, 2 inches of compression depth, and a release time of 200 milliseconds shown in FIG. 2. This waveform is typical of the waveform expected from a cardiac arrest victim undergoing chest compression at a rate of 80 compression per minute, with compression phase of about 100 msec (which may be variable, depending on the stiffness of the patient's thorax), a compression hold at the peak of compressions which terminates at 200 milliseconds from the start of compression, and a 200 msec release phase, performed to a depth of 2 inches. This waveform differs from a healthy waveform in FIG. 1 because the primary pressure source is the compression of the chest by an external chest compression device. The reflected wave due to the resilience of the aorta and other blood vessels, shown in FIG. 1, may not occur during CPR compressions. This CPR-induced waveform exhibits a steeply increasing portion 6 and a sharp peak 7 at about 70 mm Hg, followed by a short drop in pressure followed by a clearly discernable notch 8. This notch resembles a dicrotic notch 5 (from the healthy patient waveform corresponding to closure of the aortic valve), but occurs at a midpoint in the CPR systolic period. This wave form does not show an inflection point 4 of the healthy waveform that is considered to be reflective of the appearance of a reflected pressure wave 3. The wave form includes a "systolic" shelf 9 which occurs during the compression hold period, after the notch 8. The notch 8 and shelf 9 may or may not be indicative of a reflected waveform cause by the elastance of aorta and other blood vessels. The area under the peak and the notch and shelf corresponds to the SPTI of FIG. 3, though it derives from the CPR-systole (as coined herein) rather that the action of a beating heart. The area under the CPR pulse pressure waveform after the compression hold, during the release upstroke and inter-compression hold corresponds in like manner to the DPTI. We refer to them below as the CPR-SPTI and the CPR-DPTI. Though the concept is not used in relation to healthy patients, the entire area under the CPR pulse pressure waveform (which may be referred to as the total pressure time interval, or TPTI) may also be useful as an indication of the effectiveness of CPR compressions.

Figure 4:
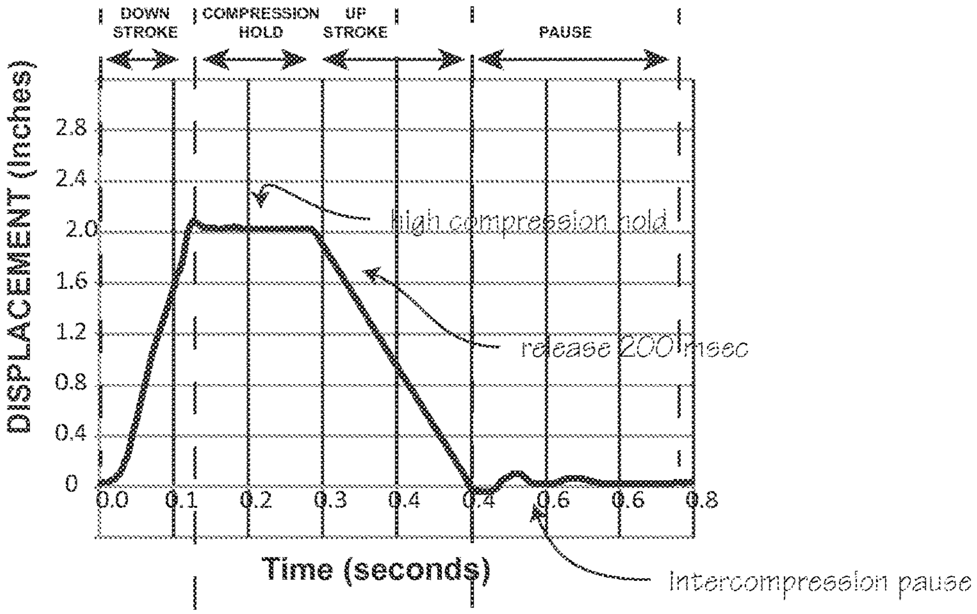
FIG. 4 depicts a compression waveform resulting from the operation of a CPR compression device with a longer release compared to the compression waveform of FIG. 2.
Figure 5:
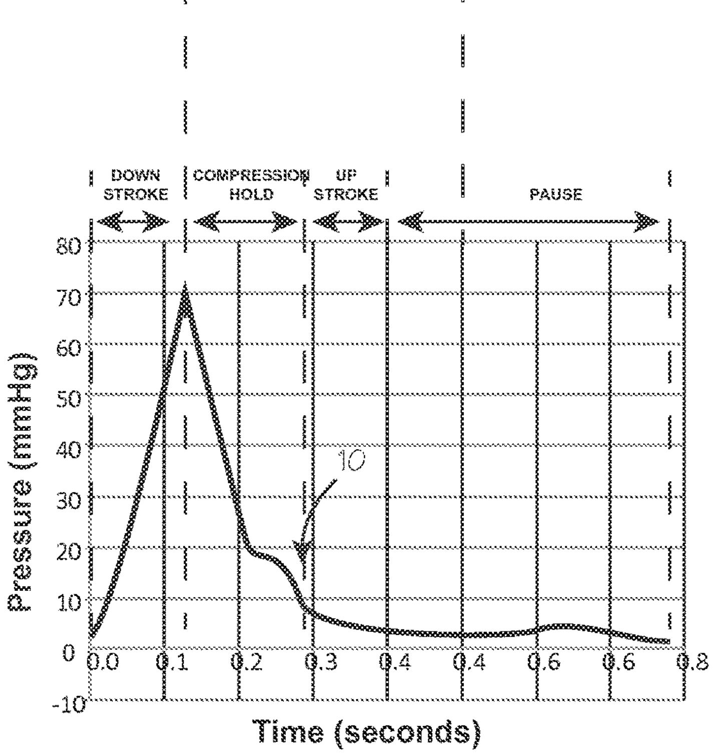
FIG. 5 depicts a pulse pressure waveform of a cardiac arrest victim undergoing effective CPR chest compressions depicted in FIG. 4.

FIG. 4 depicts a compression waveform of a cardiac arrest victim undergoing CPR chest compressions that are different than those of FIG. 2. The compression waveform is induced by CPR compressions performed by an AutoPulse® CPR compression device operating at 80 compressions per minute, 2 inches of compression depth, and a release time of 300 milliseconds. The resultant CPR pulse pressure waveform is depicted in FIG. 5. In FIG. 5, the pulse wave peak is also about 70 mm Hg, as in FIG. 3. The compression down stroke is the same as in FIG. 2, so that the peak is, as expected, coincident, or nearly coincident, with the end of the compression stroke. The longer release time results in a CPR pulse pressure waveform that lacks a dicrotic notch 5 of FIG. 3 and has a very weak shelf feature 10, compared to the more evident shelf 9 of FIG. 3. Thus, the SPTI and DPTI are much reduced compared the pulse pressure waveform of FIG. 3. Though this may be effective in inducing blood flow, it may not be as beneficial as the waveform of FIG. 3, at least for the particular subject of this compression waveform.

Figure 6:
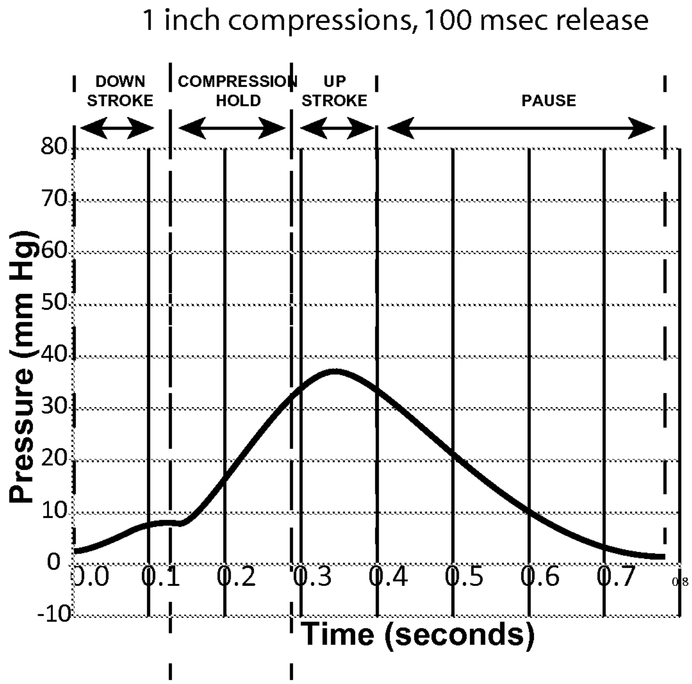
FIG. 6 depicts a pulse pressure waveform of a cardiac arrest victim undergoing ineffective CPR chest compressions.

FIG. 6 depicts a pulse pressure waveform of a cardiac arrest victim undergoing ineffective CPR chest compressions, at a compression depth of 1 inch, and a release time of 100 milliseconds. The waveform is induced by CPR compressions performed by an AutoPulse® CPR compression device operating at 80 compressions per minute, 1 inch of compression depth, and a release time of 100 milliseconds. This waveform differs from an effective waveform of FIG. 3 in that it is very low amplitude, and does not display the notch of FIG. 3, or the shelf of FIG. 3 or 4. The peak pressure is very late in the compression cycle, and occurs near the end of the compression hold of the compression cycle. The area under the CPR systolic portion and the CPR diastolic portion of the wave is much smaller, and thus the CPR-SPTI and CPR-DPTI is much reduced compared to FIGS. 3 and 5.

Figure 7:
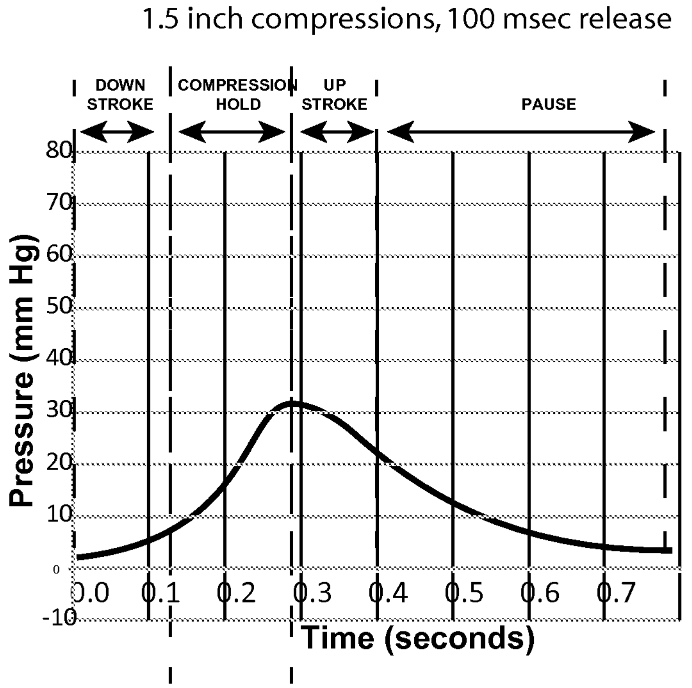
FIG. 7 depicts a pulse pressure waveform of a cardiac arrest victim undergoing ineffective CPR chest compressions.

FIG. 7 depicts a pulse pressure waveform of a cardiac arrest victim undergoing ineffective CPR chest compressions, at a compression depth of 1.5 inches, and a release time of 100 milliseconds. The waveform is induced by CPR compressions performed by an AutoPulse® CPR compression device operating at 80 compressions per minute, 1 inch of compression depth, and a release time of 100 milliseconds. This waveform differs from an effective waveform of FIG. 3 in that it is very low amplitude, and does not display the notch of FIG. 3, or the shelf of FIG. 3 or 5. The peak pressure is very late in the compression cycle, and occurs near the end of the compression hold of the compression cycle. The area under the CPR systolic portion and the CPR diastolic portion of the wave is much smaller, and thus the CPR-SPTI and CPR-DPTI is much reduced compared to FIGS. 3 and 5.

The waveforms of FIGS. 3 through 7 can be distinguished, and various characteristics determined, through routine feature extraction signal processing techniques.

Figure 8:
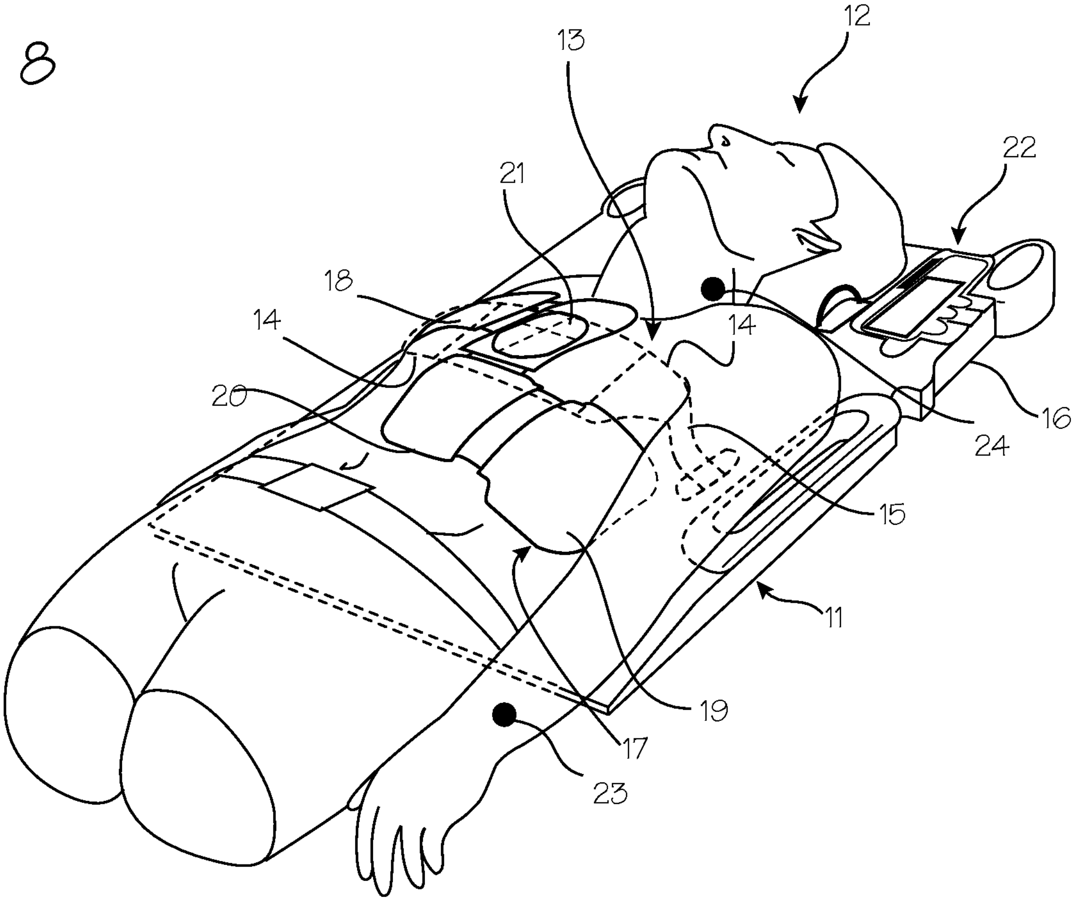
FIG. 8 shows a cardiac arrest victim fitted with an chest compression device and various tonometric sensors.
Figure 9:
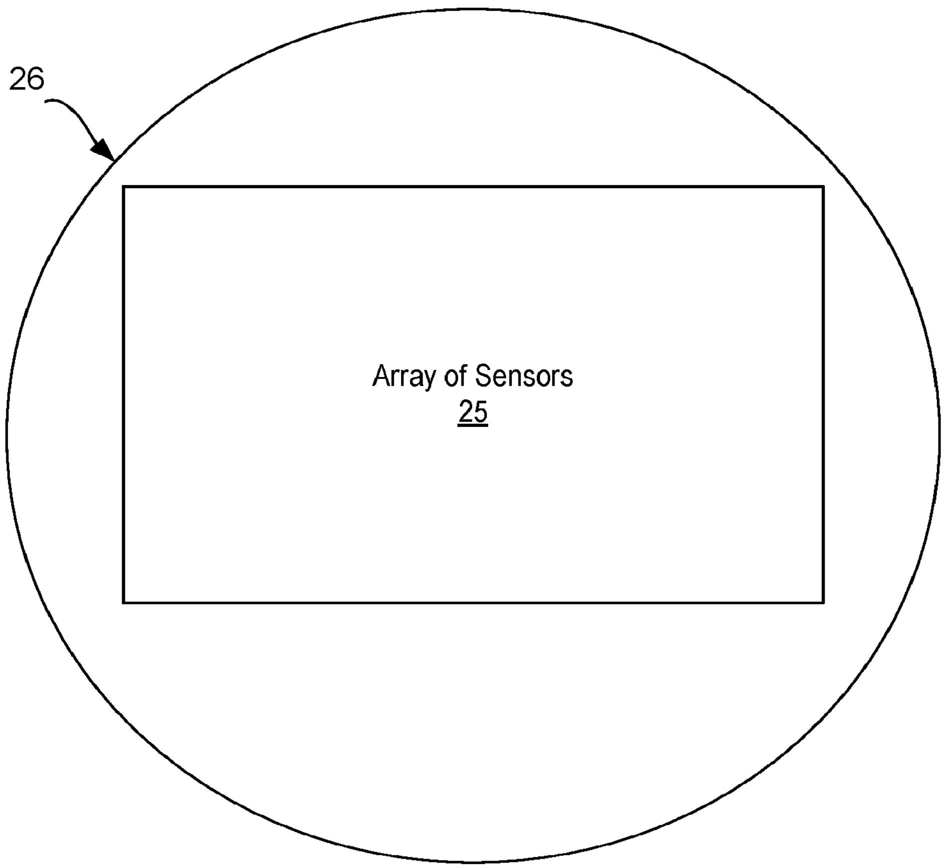
FIG. 9 is a block diagram that shows an array of sensors disposed on a flexible substrate.

The waveforms of FIGS. 3 through 7 can be obtained from a cardiac arrest victim using sensors operable to detect the variations in blood flow and pressure at peripheral locations such as the radial artery, the brachial artery, the carotid artery and the femoral artery. FIG. 8 shows a cardiac arrest victim fitted with a chest compression device and various tonometric sensors. The chest compression device 11 is installed on the patient 12. The chest compression device is described in our U.S. Pat. No. 7,410,470 (incorporated herein by reference in its entirety) and includes a compression belt 13 (shown in phantom) with load distributing panels 14 and pull straps 15 (one on each side of the patient) attached to a drive spool and a motor within the housing 16. The compression device is operable to repetitively tighten the belt at a resuscitative rate and depth for extended periods. The compression device may also comprise a piston based compression device as disclose in Nilsson, et al., *CPR Device and Method*, U.S. Patent Publication 2010/0185127 (Jul. 22, 2010), which operates on the same principle as the Thumper® chest compression device, or it may comprise an inflatable vest system as disclosed in U.S. Pat. No. 4,928,674, or any other means for compressing the chest to induce blood flow. As depicted in FIG. 8, an ECG electrode assembly 17 is disposed on the patient's chest, under the load distributing band. This assembly includes the sternum electrode 18, the apex electrode 19, the sternal bridge 20 and the chest compression monitor 21. The chest compression monitor and electrodes are connected to a defibrillator directly or through a connection built into the housing. The chest compression monitor is disposed between the patient and the load distributing panels, above the sternum of the patient. The AutoPulse® compression device is capable of rapidly compressing the patient's thorax and holding the thorax in a state of compression, during each compression cycle. The AutoPulse® compression device is also capable of holding the belt taught for a short period between each compression cycle, as depicted in the compression waveform of FIG. 3. Operation of the compression device is controlled by a control system which is a computer programmed to operate the chest compression device according to regimens of depth, compression hold time, release time, and intercompression pause, and overall compression rate. The control system comprises at least one processor and at least one memory including program code with the memory and computer program code configured with the processor to cause the system to perform the functions described throughout this specification. The various functions of the control system may be accomplished in a single computer or multiple computers, and may be accomplished by a general purpose computer or a dedicated computer, and may be housed in the housing or an associated defibrillator. For piston based compression devices and inflatable vest systems, a comparable control system can operate the piston, or control inflation of the vest, to accomplish compressions with comparable compression regimens.

The CPR compression device includes an input device 22, such as a touchscreen or keyboard or pushbuttons, and an output device such as a display screen (which may be integral with the touchscreen input device) and/or audio speakers, all interoperable with the control system to accept input from a user or provide output to a user. The input device is operable, by a user, to initiate operation of the device, and provide inputs to the control system.

The compression regimens are preferably predetermined in the sense that they are programmed by the manufacturer of the device at the time of manufacture, and can be selected by the control system in response to feedback, as described below, and are not subject to alteration by an operator while in use. However, if it is desirable to allow alteration of the compression regimen by CPR providers, at the point of use, the control system can be programmed to accept user input and alter the compression regimen according to operator input during or immediately before use.

In addition to the compression device, the system for implementing the methods described herein includes peripherally located non-invasive sensor 23 mounted on the patient's arm (on the medial side of the arm over the radial or brachial artery) and noninvasive sensor 24 on the patient's neck, mounted over the patient's common carotid artery. These and other peripherally located surface mounted tonometric sensors can be used to obtain peripheral tonometric information, such as CPR-induced pulse waves, from which the aortic pulse pressure waveform can be determined, and generate signals indicative of blood pressure or CPR-induced pulse waves of the cardiac arrest victim. These sensors may be any tonometric sensor, pulse velocity sensor, or pulse pressure sensor. The flexible pressure sensors described in Schwartz, et al., *Flexible Polymer Transistors With High Pressure Sensitivity For Application In Electronic Skin And Health Monitoring,* 4 Nature Communications 1859 (2013), for example, include two or more pressure sensing elements closely spaced (about 0.2 inches apart) on a flexible substrate 26. The sensors can measure pressures at intervals 100 milliseconds or less. With an array of these sensors 25, including a plurality of such sensors mounted in a flexible substrate 26, which in turn is mounted on the skin of the cardiac arrest victim (for example at the wrist, secured with a band or adhesive strip), a two-dimensional map of pressure over the area covered by the array of sensors can be obtained. This two-dimensional map can be analyzed by the control system to determine the pulse pressure wave passing through a peripheral artery over which the array is disposed, with certainty that the array will capture the pressure wave.

To use input from these sensors, the control system is programmed to accept the tonometric signals indicative of the blood pressure or CPR-induced pulse of the cardiac arrest victim generated by the tonometric sensors, and produce an aortic pulse pressure waveform based on the tonometric signals. The control system is further programmed to determine one or more characteristics of the pulse pressure waveform. These characteristics can include the area under a specified portion of the CPR-PPW (the CPR-SPTI, the CPR-DPTI, the total CPR-PTI) the pseudo-reflection inflection point, the peak pulse pressure, pulse transit time, etc. (Though impractical in the field, tonometric data can be obtain in hospital settings with tonometric sensors disposed within the aorta of the patient, and this data can be used as feedback for the CPR compression device.)

To determine the optimum compression regimen, which includes combinations and sub-combinations of compression parameters such as compression depth, compression rate, compression rise time, compression hold time, and release velocity, the compression device may initially, and occasionally during the course of CPR compressions, test various compression regimens, determine the resultant pulse pressure waveform characteristics from each distinct compression regimen, and compare the characteristics and thereafter perform compressions according to the regimen that provides the most favorable pulse pressure waveform characteristics. The control system is thus programmed to determine the effectiveness of chest compression by operating the compression device at a first regimen, a second regimen, a third regimen, and so on, (each distinct regimen will include a variation of one or more of the compression parameters), thus testing a cardiac victim upon initiation of CPR compressions with several compression regimens accomplished in several sets of test compressions, and experimentally and preferably non-invasively determining the compression waveform that provides the best aortic pulse pressure waveform. The aortic pulse pressure waveform is preferably estimated using a peripheral pressure waveform as an input to a generalized transfer function (though it can be measured invasively), and the control system is programmed to accept peripheral waveform signals, apply the transfer function to those signals, and derive estimated aortic pulse pressure waveforms. From the estimated aortic pulse pressure waveform, the control system determines a parameter or characteristic of the pulse pressure waveform, which can be one of the several characteristics. The input peripheral pulse pressure wave form is produced by the action of the chest compression device. The system performs a series of test compressions with different compression parameters (including one or more parameters such as compression depth, compression rate, compression rise time, compression hold time, release velocity, etc., alone or in various permutations) to determine which of several chest compression regimens provides the best aortic pulse pressure waveform (on the basis of parameters such as peak pressure, a pressure time integral such as DPTI, SPTI, TTPI, detection of a the pseudo-reflection inflection point or notch or a combination of these). For example, the control system is programmed to perform initial test compression sets of 5 to 10 compressions, according to several varied compression regimens (the number is of test sets is not critical, and be enlarged or limited as clinical experience dictates), as follows:

Perform a set of compressions under a first regimen, for example at 80 cpm/2.0 inches depth/200 msec release time, and determine CPR-SPTI, or CPR-DPTI, or CPR-TPTI and/or detect the pseudo-reflective inflection point or notch; and Perform a set of compressions under a second regimen, for example at 80 cpm/2.0 inches depth/300 msec release time, and determine CPR-SPTI, or CPR-DPTI, or CPR-TPTI and/or detect the pseudo-reflective notch;

Perform a set of compressions under a third regimen, for example at 80 cpm/1.5 inches depth/200 msec release time, and determine CPR-SPTI, or CPR-DPTI, or CPR-TPTI and/detect the pseudo-reflective notch;

Perform a set of compressions under a fourth regimen, for example at 100 cpm/2.0 inches depth/200 msec release time, and determine CPR-SPTI, or CPR-DPTI, or CPR-TPTI and/or detect the pseudo-reflective notch; and Perform a set of compressions under a first regimen, for example at 100 cpm/2.0 inches depth/300 msec release time, and determine CPR-SPTI, or CPR-DPTI, or CPR-TPTI and/or detect the pseudo-reflective notch;

Perform a set of compressions under a fifth regimen, for example at 100 cpm/1.5 inches depth/200 msec release time, and determine CPR-SPTI, or CPR-DPTI, or CPR-TPTI and/or detect the pseudo-reflective notch.

After collecting various CPR pulse pressure waveforms, the control system determines, based on predetermined criteria, which pulse pressure waveform represents the optimum blood flow criteria which may be the largest CPR-SPTI (which is associated with the compression period), or CPR-DPTI (which is associated with the release period), or CPR-TPTI (which is associated with the entire compression cycle), or the largest or earliest pseudo-reflective notch, or the highest peak pressure. We currently prefer the CPR-SPTI as the parameter most likely to associated with effective CPR-compression-induced blood flow. When the pressure time integrals are used, the largest value is considered to indicate the best blood flow. For the detection of the pseudo-reflective notch, the earliest appearance of the notch is indicative of the optimum blood flow. After making this determination of the optimum pulse pressure waveform, the control system, according to its programming, operates the chest compression device to provide therapeutic chest compressions according to the compression regimen that corresponds to the optimum pulse pressure waveform. Sets of therapeutic compression can include uninterrupted, continuous compressions at a resuscitative rate for several minutes, or extended periods of typical compression sets of 30 compressions, interrupted for rescue breathing, repeated until the patient is revived, or CPR is suspended for defibrillation or follow-on care, or the CPR efforts are abandoned when the patient is no longer subject to resuscitation. (Note that the test compression sets described above may all be effective as therapeutic chest compressions, so that test compressions and test compression sets may be viewed as a subset of the therapeutic compressions.)

From time to time, over the course of CPR resuscitation effort including many chest compressions applied in sets of 15 compressions or applied continuously for several minutes, the system operates to alter the chest compression regimen, running through the several regimens, to again test the patient to update the determination of the optimum chest compression regimen, and thereafter continues compressions using the regimen that provides the optimum blood flow as indicated by the chosen parameter. This is beneficial because the tone (the compliance and elastance) of the patient's vasculature, especially the aorta, tends to degrade over the course of CPR compressions, so that the optimum compression regimen may change over an extended course of CPR compressions.

Summarizing the method described above, the method entails providing CPR compressions on a cardiac arrest victim, obtaining compression induced pulse pressure waveforms caused by the chest compressions, and adjusting a parameter of the chest compressions based on a characteristic of the pulse pressure waveforms. The method can be performed according to the following steps:

(1) performing chest compressions on the cardiac arrest victim with a chest compression device, which will result in compression induced waveforms detectable at peripheral locations on the victim's body;

(2) obtaining compression-induced pulse pressure waveforms at peripheral locations of the cardiac arrest victim while performing chest compressions, preferably using tonometric sensors disposed on the victim's body;

(3) determining a characteristic of the compression-induced pulse pressure waveforms, either directly from the peripherally detected waveforms or indirectly by processing the peripherally detected waveforms to determine an estimated aortic pulse wave form;

(4) while performing the chest compressions, performing a first subset of compressions according to a first compression regimen, and performing a second set of compressions according to a second compression regimen;

(5) determining a characteristic of the compression-induced pulse pressure waveforms associated with the first subset of compressions;

(6) determining a characteristic of the compression-induced pulse pressure waveforms associated with the second subset of compressions;

(7) comparing the characteristic of the first subset of compressions and characteristic of the second subset of compressions, and determining on the basis of the comparison which of the two chest compression regimens is likely to provide better CPR-induced blood flow;

(8) continuing to perform chest compression according to regimen which is likely to provide the better CPR-induced blood flow.

In this method, the characteristic may be any one of the characteristics mentioned above (including CPR-SPTI, CPR-DPTI, CPR-TPTI, or the largest or earliest pseudo-reflective notch, or the highest peak pressure.) The preferred characteristic may be varied as clinical experience dictates, and additional characteristics may be identified which also prove useful in the method.

For a long course of CPR chest compressions, the method may also include periodically repeating the step of determining a characteristic of compression induced pulse pressure waveforms for different pair of subsets of compressions performed under differing compression regimens, comparing the characteristics of each new subset of compressions, and determining which of the differing compression regimens is likely to provide the better CPR-induced blood flow, and then continuing to perform chest compressions according to the chest compression regimen determined to be likely to provide better CPR-induced blood flow. The different pair of subsets can include compressions performed according to the originally determined optimum regimen, and a regimen expected to be most appropriate to a patient exhibiting degraded compliance, or the regimens may both be different from the regimen in effect at the time the new comparison is made.

Vascular tone may degrade during the course of CPR. Vascular tone is indicated by arterial compliance/elastance, which can be measured and/or estimated with pulse transit time. Epinephrine is administered under the theory that it restores elasticity beneficial to reduce vascular stiffness and improve vascular elastance, and increase diastolic pressure, which is beneficial to CPR blood flow. On the other hand, epinephrine tends to lower blood oxygen levels. Thrush, et al., Is *Epinephrine Contraindicated During Cardiopulmonary Resuscitation?,* 96 Circulation 2709 (1997). It would therefore be helpful to avoid administration of epinephrine unless it is helpful in improving vascular tone.

Arterial stiffness (compliance/elastance) can be determined during the course of CPR compressions by measuring the CPR pulse wave velocity or pulse transit time. In healthy patients, aortic pulse wave velocity ranges from 5 meters per second to 15 meters per second. During CPR, the CPR pulse wave velocity is initially expected to be less, but the absolute or instantaneous value of the pulse wave velocity is not necessarily informative, although extreme stiffness may indicate a need for epinephrine without further information. Changes in the pulse wave velocity over the course of CPR compressions, and/or in response to administration of epinephrine, however, may be informative regarding the need for epinephrine, the effect of administration, or the need to discontinue or continue administration of epinephrine.

Over the course of CPR, the arterial stiffness is likely to increase. This degrades the Windkessel effect of the arteries, and thus degrades the effectiveness of CPR. Continuous or occasional determination of arterial compliance/elastance/pulse wave velocity during the course of CPR compressions can be used to determine the need for epinephrine. Based on changes, or lack of change, in arterial compliance/elastance/pulse wave velocity subsequent to administration of epinephrine during the course of CPR compression, the beneficial effect of epinephrine, or lack of effect of epinephrine on vascular tone can be assessed, and further decisions to administer epinephrine can be made based on this information. Alternately, based on the change of arterial compliance/elastance/pulse wave velocity over the course of CPR compressions, epinephrine may be avoided initially, and administered when arterial stiffness degrades by a predetermined level relative to the initially determined level, such as 20% of the level determined at the start of a resuscitation effort, during a compression set accomplished early in a resuscitation effort.

Alternatively, based on absolute values of arterial compliance/elastance/pulse wave velocity, epinephrine may be avoided for patients with an arterial stiffness estimated at typical values for healthy patients. Using pulse wave velocity as a measurement of, or a proxy for, arterial stiffness, typical values pulse wave velocity varies by age as follows:

| AGE | MEAN (±2 SD) meters/second | MEDIAN (10-90 pc) meters/second |
|---|---|---|
| <30 | 6.2 (4.7-7.6) | 6.1 (5.3-7.1) |
| 30-39 | 6.5 (3.8-9.2) | 6.4 (5.2-8.0) |
| 40-49 | 7.2 (4.6-9.8) | 6.9 (5.9-8.6) |
| 50-59 | 8.3 (4.5-12.1) | 8.1 (6.3-10.0) |
| 60-69 | 10.3 (5.5-15.0) | 9.7 (7.9-13.1) |
| ≥70 | 10.9 (5.5-16.3) | 10.6 (8.0-14.6) |

(These numbers are drawn from *Determinants Of Pulse Wave Velocity In Healthy People And In The Presence Of Cardiovascular Risk Factors: 'Establishing Normal And Reference Values'*, European 31 Heart Journal 2338 (2010), and refer to pulse wave velocity determined from two characteristics points on carotid and femoral waveforms.

These values will likely vary when assessed at different peripheral sites, and also with the algorithm used to determine pulse wave velocity from the waveforms.) For patients displaying compliance/elastance/pulse wave velocity typical of patients their age, or within about 30% of these normative values, the control system can be programed to advise a CPR provider to avoid administration of epinephrine (to support this function, the control system must be programmed to accept user input or other input providing the age of the patient, or an estimate of the age of the patient).

Epinephrine may be administered immediately for patients with an arterial stiffness estimated at 4.0 meters per second or less (using pulse wave velocity as a measurement of, or a proxy for, arterial stiffness). Under a similar regimen, Epinephrine may be administered immediately for patients with an arterial stiffness estimated at some significant deviation from the mean or median pulse wave velocity for their age group (for example, a PWV falling below 70%, or some other predetermined percentage, of the mean or median for their age group) or some significant deviation from a mean or median for all patients or a portion of the expected patient population (for example, the mean for the 50-59 year old population of 8.3 can be taken as a value for which epinephrine is not indicated, and values falling significantly below this level can be taken as a value for which epinephrine is indicated.

The numbers expressed in the previous paragraphs regarding arterial stiffness/compliance/pulse wave velocity may be adjusted as clinical experience dictates.

In the first method, the control system operates to accept input from the chest compression device indicating the state of the compression waveform (for example, identifying the time of the start of a compression, which is analogous to the foot of the aortic pulse pressure waveform) and accept input from surface mounted peripheral tonometric sensors (for example, located at the carotid, brachial, radial, or femoral arteries) to detect the arrival of a pulse pressure waveform at one or more of these peripheral locations, and from this information determine a measure of arterial stiffness. The control system is also programmed to accept user input, from an associated user input device, which indicates that epinephrine has been administered. The control system continues assessing arterial stiffness, and provides output indicating that arterial stiffness has been improved, or unaffected, subsequent to the administration of epinephrine.

These decisions regarding arterial stiffness may be made on the basis of CPR pulse wave velocity, which is used as a proxy for arterial stiffness. Pulse wave velocity is typically measured from the beginning of a heartbeat, as indicated by an ECG waveform, but for a patient in cardiac arrest the ECG is unrelated to the CPR compressions which initiate the CPR-induced pulse and pulse wave, so for the purpose of determining pulse wave velocity during CPR (a CPR Pulse wave velocity), we use the start of the compression stroke of the compression device as the starting point for measuring pulse wave velocity. Thus, the control system is programmed to accept input from the CPR compression device indicating the start of a compression, and tonometric signals from a peripherally mounted tonometric sensor to determine the arrival of a CPR-induced pulse at a peripheral location (the carotid or femoral artery), to determine the CPR pulse wave velocity.

To effectuate this method, the control system of the chest compression device and/or defibrillator and/or free standing control system can be programmed to accept inputs regarding the timing of chest compressions, the pulse waveforms measured at peripheral cites, and determine parameters such as pulse wave velocity, arterial stiffness and/or augmentation index (alone or in combination), and compare these values (1) against values previously obtained in earlier compression and thereby determine that epinephrine is or is not indicated, and provide prompts to a CPR provider to avoid epinephrine or administer epinephrine based on that determination or (2) against predetermined values chosen on the basis that they indicate that epinephrine may or may not be beneficial to improve the effectiveness of CPR chest compressions, and thereby determine that epinephrine is or is not indicated, and provide prompts to a CPR provider to avoid epinephrine or administer epinephrine based on that determination.

While the preferred embodiments of the devices and methods have been described in reference to the environment in which they were developed, they are merely illustrative of the principles of the inventions. The elements of the various embodiments may be incorporated into each of the other species to obtain the benefits of those elements in combination with such other species, and the various beneficial features may be employed in embodiments alone or in combination with each other. Other embodiments and configurations may be devised without departing from the spirit of the inventions and the scope of the appended claims.

We claim:

1. A computer-implemented method, for execution by at least one processor in association with a chest compressor and at least one sensor, to provide CPR compressions on a cardiac arrest patent, the method comprising:

applying a plurality of initial sets of chest compressions on the patient, each of the initial sets of chest compressions being performed according to a distinct chest compression regime, each distinct chest compression regime having chest compression parameters comprising at least one of: depth, compression hold time, release time, intercompression pause, and compression rate;

acquiring, for each of the initial sets of chest compressions, a corresponding CPR-induced time-domain pressure waveform generated using the at least one pressure sensor;

identifying, for each pressure waveform, one or more parameters of the pressure waveform, the one or more parameters comprising: i) a secondary peak, occurring after an initial pressure peak and during a CPR compression hold portion of the pressure waveform, and ii) at least one pressure-time integral magnitude corresponding to at least a portion of the pressure waveform, determining whether the identified one or more parameters of each pressure waveform meet one or more predetermined criteria indicative of optimum blood flow;

identifying which of the initial sets of chest compressions is associated with CPR-induced optimum blood flow, based at least in part on the comparison and determination that both the secondary peak and the pressure-time integral satisfy predetermined effectiveness criteria; and subsequent to the application of the plurality of initial sets of chest compressions, performing at least one subsequent set of chest compressions according to the chest compression regime of the initial set of chest compressions identified to be associated with optimum blood flow.

2. The method of claim 1, wherein the pressure waveform comprises a pulse pressure waveform, and obtaining the CPR-induced pulse wave signals comprises obtaining the CPR-induced pulse wave signals using at least one non-invasive sensor.

3. The method of claim 1, wherein obtaining the CPR-induced pulse wave signals comprises obtaining the CPR-induced pulse wave signals using at least one invasive sensor.

4. The method of claim 1, wherein the at least one area comprises at least one of: a CPR diastolic pressure time integral (CPR-DPTI), a CPR systolic pressure time integral (CPR-SPTI), or a CPR total pressure time integral (CPR-TPTI).

5. The method of claim 1, wherein the one or more parameters of the associated pressure waveform comprises a shelf corresponding to the CPR-SPTI.

6. The method of claim 1, wherein the pressure waveform comprises a pulse pressure waveform.

7. The method of claim 1, wherein the predetermined criteria comprise return time, wherein the return time is determined based on a time period between a start of a pressure waveform and an appearance of a reflected wave.

8. The method of claim 1, wherein the plurality of initial sets chest compressions comprises at least two sets of chest compressions, and wherein identifying which one of the at least two sets of chest compressions is associated with optimum blood flow comprises identifying which of the at least two sets of chest compressions is more likely to provide better CPR-induced blood flow.

9. The method of claim 1, wherein applying the plurality of initial sets of chest compressions comprises adjusting operation of the chest compressor.

10. The method of claim 9, wherein adjusting operation of the chest compressor is based at least in part on the identified one or more parameters of the pressure waveform associated with each of the initial sets of chest compressions determined to be associated with optimum blood flow.

11. The method of claim 1, wherein performing the at least one subsequent set of chest compressions according to the chest compression regime of the initial set of chest compressions identified to be associated with optimum blood flow comprises adjusting at least one of the chest compression parameters.

12. The method of claim 11, wherein adjusting at least one of the chest compression parameters comprises adjusting at least one of: chest compression depth, chest compression rate, chest compression release velocity, chest compression rise time, or chest compression hold time.

13. The method of claim 1, wherein applying the plurality of initial sets of chest compressions comprises applying:

a first set of chest compressions under a first regime;

a second set of chest compressions under a second regime; and a third set of chest compressions under a third regime;

wherein each of the first regime, the second regime and the third regime are performed with a specified chest compression rate, a specified chest compression depth and a specified chest compression release time; and wherein each of the first regime, the second regime and the third regime are performed with at least one variation relative to each other and relating to at least one of chest compression rate, chest compression depth, and chest compression release time.

14. The method of claim 13, wherein each of the first regime, the second regime and the third regime are performed according to a regime comprising a chest compression rate of between 80 and 100 compressions per minute (cpm), a chest compression depth of between 1.5 and 2.0 inches, and a release time of between 100 and 300 msecs.

15. The method of claim 13, comprising determining a CPR pulse wave velocity associated with a chest compression performed on the patient by the chest compressor, based at least in part on signals received from the chest compressor and signals received from the at least one sensor.

16. The method of claim 13, comprising estimating an arterial stiffness of the patient based at least in part on a CPR pulse wave velocity determined from the time delay between waveform features of the time-domain pressure waveform associated with the chest compressions.

17. The method of claim 16, comprising, based at least on the estimated arterial stiffness, providing output relating to whether to administer epinephrine to the patient or to avoid administering epinephrine to the patient.

18. The method of claim 17, wherein the provided output relating to whether to administer epinephrine to the patient or to avoid administering epinephrine to the patient comprises providing the output at a time during a period during which chest compressions are being performed on the patient.

19. The method of claim 1, comprising allowing interruption between, or discontinuance of, sets of chest compressions for performance of rescue breathing on the patient.

20. The method of claim 1, wherein identifying the one or more parameters of the pressure waveform comprises identifying a post-peak pressure wave feature occurring after the initial pressure peak of the CPR-induced pressure waveform, the post-peak pressure wave feature comprising at least one of a notch, a shoulder, or a shelf.

21. The method of claim 20, wherein determination that both the pressure waveform feature and the pressure-time integral satisfy predetermined effectiveness criteria comprises determining presence of the post-peak pressure wave feature.

22. The method of claim 20, wherein identifying that the pressure time integral satisfies predetermined effectiveness criteria comprises determining that a magnitude of the pressure wave time integral, integrated over at least a portion of the pressure waveform, exceeds a predetermined threshold.

* * * * *